_(12)_ United States Patent
Quilici et al.

(10) Patent No.: US 10,848,618 B1
(45) Date of Patent: Nov. 24, 2020

(54) DYNAMICALLY PROVIDING SAFE PHONE NUMBERS FOR RESPONDING TO INBOUND COMMUNICATIONS

(71) Applicant: YouMail, Inc., Irvine, CA (US)

(72) Inventors: Alexander E. Quilici, Malibu, CA (US); Michael J. Rudolph, San Juan Capistrano, CA (US)

(73) Assignee: YouMail, Inc., Irvine, CA (US)

( * ) Notice: Subject to any disclaimer, the term of this patent is extended or adjusted under 35 U.S.C. 154(b) by 0 days.

(21) Appl. No.: 16/731,715

(22) Filed: Dec. 31, 2019

(51) Int. Cl.
*H04M 3/436* (2006.01)
*H04M 3/42* (2006.01)

(52) U.S. Cl.
CPC ....... *H04M 3/436* (2013.01); *H04M 3/42059* (2013.01); *H04M 2203/551* (2013.01); *H04M 2203/558* (2013.01)

(58) Field of Classification Search
None
See application file for complete search history.

(56) References Cited

U.S. PATENT DOCUMENTS

| | | | |
|---|---|---|---|
| 9,060,057 B1* | 6/2015 | Danis | H04M 3/42059 |
| 2006/0224677 A1* | 10/2006 | Ishikawa | H04L 63/1483 709/206 |
| 2012/0287823 A1* | 11/2012 | Lin | H04M 3/42042 370/259 |
| 2015/0023485 A1* | 1/2015 | Guarriello | H04M 3/42161 379/88.23 |
| 2015/0121480 A1* | 4/2015 | Efrati | H04L 63/1466 726/5 |
| 2019/0130913 A1* | 5/2019 | Li | G10L 15/22 |
| 2020/0053205 A1* | 2/2020 | Sial | H04M 3/42042 |

\* cited by examiner

*Primary Examiner* — Antim G Shah
(74) *Attorney, Agent, or Firm* — Meister Seelig & Fein LLP; Seth H. Ostrow, Esq.

(57) ABSTRACT

A system and method for dynamically providing safe call back numbers to use to respond to an inbound communication, the method comprising parsing message records from a message server, analyzing the message records for untrustworthy phone numbers by comparing content of the message records to a reference data set that is retrieved from a database, the reference data set including genuine and fraud data wherein the genuine and fraud data includes entities and contact information corresponding to the entities, determining untrustworthy phone numbers in the message records from the analysis, and generating remedy actions based on the determination of the untrustworthy phone numbers.

22 Claims, 5 Drawing Sheets

DYNAMICALLY PROVIDING SAFE PHONE NUMBERS FOR RESPONDING TO INBOUND COMMUNICATIONS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to scanning messages for fraud, and in particular, evaluating whether contact information in messages are associated with legitimate entities and substituting proper contact information before a user attempts to return the message.

Description of the Related Art

Currently, a "robocaller," telemarketer, or scammer can disseminate a phone number or other contact information by means of communication via a call, text, or email. If the communication is not blocked, the communicator may leave a message, such as a voice message, with a phone number or contact information that the recipient of the communication should call back. The message may suggest that the phone number or contact information is, for example, the recipient's bank, car company, credit card, the IRS (Internal Revenue Service) or other government entity, and may state that the user is required to return the call because of an alleged fraud on their account or an expiring warranty or other urgent need. The message may use a reputable name, such as a name of a bank, credit card company, or other business name to give an authentic appearance.

When the recipient returns the call or communication, however, they are solicited or scammed into buying a service they don't need, prompted to provide account information which can result in identity theft, or otherwise inconvenienced or harmed by virtue of having contacted an entity with which they do not wish to communicate. Many smartphones currently facilitate a user returning a call to this improper phone number by generating a link on the phone number in the transcribed voice message, text message or email that the user merely needs to touch to then be taken to a phone app with the number loaded into the dial field ready to be called. Current voicemail or inbox systems do not assist communication recipients in distinguishing contact from fraudulent or other untrustworthy entities from legitimate entities.

As a result, if a recipient wants to somehow determine whether the given entity that appears to have contacted them is "real", they need to do time-consuming real-time research for example, an internet search—to look up the official contact information from the entity, such as on their web site or "contact us" page, which itself may encounter fake information (due to incorrectly entered web site names or fraudulent search results).

There is thus a need for a message scanning system that can authenticate contact information of legitimate entities to prevent users from returning calls to untrustworthy or improper phone numbers. There is also a need to automatically provide a safe mechanism to contact the entity, since it is uncertain if a given contact claiming to be from that entity is real or untrustworthy.

SUMMARY OF THE INVENTION

The present invention provides systems and methods for dynamically providing safe call back numbers to use to respond to an inbound communication. According to one embodiment, a system comprises a processor and a memory having executable instructions stored thereon that when executed by the processor cause the processor to parse a message or call history record and extract entity contact data from the parsed message or call history record. The entity contact data may include at least a phone number and alleged entity name. The processor is further configured to compare the extracted entity contact data with a reference data set that is retrieved from a database storing genuine and fraud data, where the genuine and fraud data includes entities and contact data corresponding to the entities, determine the entity contact data is not authentic based on the comparison of the entity contact data, and execute a remedy action based on the determination, the remedy action including a replacement of the phone number with an authentic phone number based on the determination.

The remedy action may be performed automatically, with user consent, in advance of an attempt to call the phone number, or in real-time as a user attempts to dial the phone number. The remedy action may further include a message that the phone number has been replaced. In another embodiment, the remedy action further includes a warning that the message or call history record includes fraudulent or other untrustworthy information. In another embodiment, the remedy action further includes blocking of a communicator of a message or call associated with the message or call history record from incoming and outgoing communications. In yet another embodiment, the remedy action further includes an insertion of a visual indicator or icon next to the phone number in the message or call history record that includes an alert that the phone number is suspicious. The visual indicator or icon may further include a link to call a correct number.

The processor can be further configured to determine that a communicator of a message or call associated with the message or call history record is unwanted or suspicious based on the comparing of the entity contact data and determine the entity contact data is not authentic based on the determination that the communicator is unwanted or suspicious. The processor may also be configured to access an electronic message inbox. The message or call history record may comprise at least one of a voice message, a transcribed voice message, and a text message. The processor may be configured to parse the message or call history record by identifying information of interest. The processor may verify the entity contact data by performing at least one of caller carrier analysis, cellular/landline analysis, fingerprinting, and matching to a database of templates associated with fraudulent or suspicious messages. The system may comprise the processor further configured to replace the contact data in the message or call history record with verified contact data based on the determination that the contact data is not authentic. The processor may be further configured to identify caller identification data and confirm the alleged entity based on the caller identification data and a user contact list.

According to one embodiment, the system comprises a database including a reference data set, the reference data set including genuine and fraud data wherein the genuine and fraud data includes entities and contact information corresponding to the entities, a message scanning server communicatively coupled to a message server, the message scanning server configured to parse message records from the message server, analyze the message records for fraudulent or other untrustworthy phone numbers by comparing content of the message records to the reference data set, and determine untrustworthy phone numbers in the message records from the analysis, and a prescription rule server communicatively coupled to the message scanning server, the prescription rule server configured to generate remedy actions based on the determination of the untrustworthy phone numbers.

The remedy action may include at least one of preventing calls to the untrustworthy phone numbers, generating warnings of the untrustworthy phone numbers, and substituting the untrustworthy phone numbers in the message records with correct phone numbers. The genuine and fraud data may include numbers of legitimate calling entities. The genuine and fraud data may include known fraudulent numbers. The database may further comprise one or more of a fingerprinting database, a database of suspicious text and messaging patterns, a database of carriers and their scores, and a database of valid phone numbers. The message record may comprise at least one of voice messages, transcribed voice messages, and text messages. The message scanning server may be further configured to parse a call history record, extract contact data from the parsed call history record, compare the contact data with the reference data set, and determine the contact data is not authentic based on the comparison. The prescription rule server may be further configured to replace the contact data with verified contact data based on the determination that the contact data is not authentic.

According to one embodiment, the method comprises parsing message records from a message server, analyzing the message records for untrustworthy phone numbers by comparing content of the message records to a reference data set that is retrieved from a database, the reference data set including genuine and fraud data wherein the genuine and fraud data include entities and contact information corresponding to the entities, determining untrustworthy phone numbers in the message records from the analysis, and generating remedy actions based on the determination of the untrustworthy phone numbers.

The method may further comprise analyzing the message records by performing at least one of caller carrier analysis, cellular/landline analysis, fingerprinting, and matching to a database of templates associated with fraudulent or suspicious messages. The remedy action may include at least one of preventing calls to the untrustworthy phone numbers, generating warnings of the untrustworthy phone numbers, and substituting the untrustworthy phone numbers in the message records with correct phone numbers. The message records may comprise at least one of voice messages, transcribed voice messages, and text messages. The method may further comprise parsing a call history record, extracting entity contact data from the parsed call history record, comparing the extracted entity contact data with the reference data set, determining the entity contact data is not authentic based on the comparison, and replacing the contact data with verified contact data. The alleged entity may be confirmed based on caller identification data and a user contact list.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Figure 1:
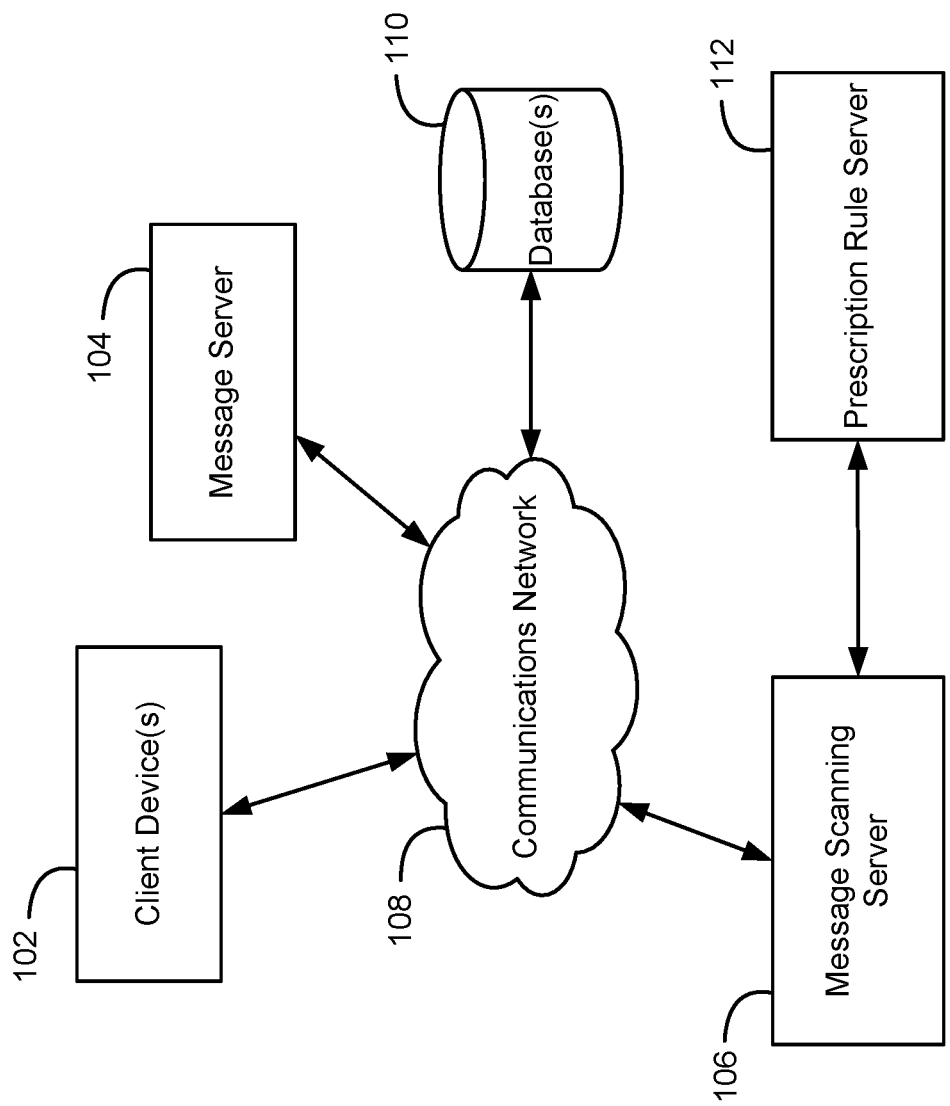
FIG. 1 illustrates a computing system according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present application discloses systems and methods for safely returning calls based on phone numbers in messages from unknown or unwanted callers or numbers. According to one embodiment, a system may comprise a server and/or client device executing code that scans a user's voice messages (either in audio or transcriptions), text messages, or caller identification ("caller ID") data history (e.g., of "missed calls"), and recognize phone numbers from the messages or caller ID data. The system may check the caller's phone number and identify the caller or determine if it's wanted or unwanted (using, for example, with white/black lists or with more advanced techniques as described in commonly owned U.S. Pat. No. 10,051,121, entitled "SYSTEM AND METHOD FOR IDENTIFYING UNWANTED COMMUNICATIONS USING COMMUNICATION FINGERPRINTING" which is herein incorporated by reference in its entirety). The system may also provide an alternative or a guaranteed safe number that can be used to return a call, for times when a caller cannot be 100% trusted to be the number of a claimed entity.

If the caller's phone number is unknown or unwanted, the system may search and determine whether the phone number is either authentic or fraudulent or otherwise untrustworthy, e.g., by comparing it to a database of known numbers for who the caller claims to be. For example, if the caller claims to be from the user's bank, the system may compare the phone number against a database of phone numbers for the user's bank or all banks, as appropriate. The phone number can also be compared against a list of known scam or unwanted numbers. However, if the phone number left in the message fails to be authenticated, the system may either prevent the call recipient from calling that phone number back or substitute the phone number in the message for an actual number for who that caller claims to be. For example, if the voice or text message from the caller says, "please contact Chase Bank regarding a potential fraud on your account," the system may substitute a fraudulent phone number provided in the message with an actual phone number corresponding to Chase Bank's fraud prevention line from a database. The system may inform or provide an indication to the user that the system is performing such a function or operation and give the user the option which phone number to call, or otherwise may just substitute the fraudulent phone number without notifying the user.

FIG. 1 presents a computing system according to an embodiment of the present invention. The system may comprise client device(s) 102 that are capable of establishing and receiving telephonic communications via communications network 108. The communications network 108 may include one or more public switch telephone networks, local area networks, wide area networks, the Internet, private VPN's (virtual private networks), or any other communications networks. In some embodiments, the client device(s) 102 are enabled with an application such as the one available from YouMail Inc., www.youmail.com, the assignee of the present patent application.

Client device(s) 102 may comprise computing devices capable of executing telephony-related applications and electronic messaging applications. Examples of computing devices include mobile smartphones, desktop computers, television set top boxes, laptops, personal digital assistants (PDA), tablet computers, e-book readers, smartwatches and smart wearable devices, or any computing device having a central processing unit and memory unit capable of connecting to a communications network. The computing device may also comprise a graphical user interface (GUI) or a browser application provided on a display (e.g., monitor screen, LCD or LED display, projector, etc.). A computing device may also include or execute an application to communicate content, such as, for example, textual content, multimedia content, or the like. A computing device may also include or execute an application to perform a variety of possible tasks, such as browsing, searching, playing various forms of content, including streamed audio. A computing device may include or execute a variety of operating systems, including a personal computer operating system, such as a Windows, Mac OS or Linux, or a mobile operating system, such as iOS, Android, or Windows Mobile, or the like. A computing device may include or may execute a variety of possible applications, such as a computing software application enabling communication with other devices, such as communicating one or more messages, such as via email, short message service (SMS), or multimedia message service (MMS).

The system further includes message server 104 which may perform voice mail operations such as recording (and/or transcribing) voice messages for subscribers of client device(s) 102. A user may enable fraud message scanning by providing a client application installed on client device(s) 102, message scanning server 106, or a combination of the two, with access to their electronic message inbox including, e.g., recorded or transcribed voice messages, and user call history (e.g., when people try to simply return a call often because of seeing the caller ID or just blindly calling). hosted on the message server 104 or stored locally on client device(s) 102. The recorded or transcribed voice messages and call history logs may be scanned by the client application or message scanning server 106 to detect fraud. According to one embodiment, the client application or message scanning server 106 may analyze communication feeds including voice messages, texts and emails for fraudulent phone numbers, email addresses, websites, or other contact information.

Servers, as described herein, may vary widely in configuration or capabilities but are comprised of at least a special-purpose digital computing device or system including at least one or more central processing units and memory. A server may also include one or more of mass storage devices, power supplies, wired or wireless network interfaces, input/output interfaces, and operating systems, such as Windows Server, Mac OS X, Unix, Linux, FreeBSD, or the like. In an example embodiment, a server may include or have access to memory for storing instructions or applications for the performance of various functions and a corresponding processor for executing stored instructions or applications. For example, the memory may store an instance of the server configured to operate in accordance with the disclosed embodiments.

The client application or message scanning server 106 may be connected to database(s) 110. Database(s) 110 may include a plurality of databases including a fingerprinting database, a database of suspicious text/messaging patterns, a database of carriers and their scores, and a database of valid phone numbers or communication addresses. The database(s) 110 may contain a reference data set that can be retrieved and used to analyze the content of the communication feeds by comparing information in the reference data set against, for example, phone numbers, email addresses, websites, or contact information in the content of the communication feeds. The reference data set may include genuine and fraud data which include entities (legitimate and fraudulent) and their corresponding contact information. Genuine data may comprise lists of correct or verified phone numbers or contact information of, for example, safe entities (e.g., banks, car or credit card companies, the IRS, other call centers) who may supply their phone numbers to database(s) 110. Fraud data may comprise phone numbers or contact information of unsafe entities. Call directory servers, call screening systems, and other spam detection services may provide fraud information including lists of known fraudulent phone numbers to database(s) 110 as they are identified. For example, the client application or message scanning server 106 may determine a phone number or caller ID data in a message (or call history) is either authentic or fraudulent by comparing it to database(s) 110 of known numbers for who a caller claims to be. The phone number or caller ID data can also be compared against a list of known scam or unwanted numbers in database(s) 110.

The client application or message scanning server 106 may also be connected to a prescription rule server 112. The prescription rule server 112 may generate an executable remedy action which may dictate what actions are to be taken based on the analysis of the messages. If a phone number or other identification information left in an analyzed message or call history log is determined to be fraudulent or fails to be authenticated, prescription rule server 112 may direct the application or message scanning server 106 to prevent the recipient of the call or message from communicating with the fraudulent phone number (or block access to a link or address), generate a warning of the fraudulent phone number or identification information, or substitute the fraudulent phone number or identification information in the message or call history log with a verified number or contact information for who that caller claims to be. In certain embodiments, prescription rule server 112 may be deployed within the client application.

Message scanning and remediation can be performed either when messages or calls are received, or when a user selects a number from the message/call history to call. In one embodiment, a remedy action may include the client application inserting a visual indicator or icon next to the number in the message, such as a red star, or an exclamation point, to alert the user that the number is suspicious and should not be called. The icon may include a link which the user can select to call the correct/genuine number instead. Alternatively, the system may perform a scan and remedy action upon the client application detecting an instance where a user is trying to make a call or communication using a link in a message. According to another embodiment, the user may be prompted to perform a check or scan of the user's messages and/or call history logs. The user may be prompted with a message, such as "you're trying to return a call based on a number left in a message which might be suspicious, would you like us to check it first?"

Figure 2:
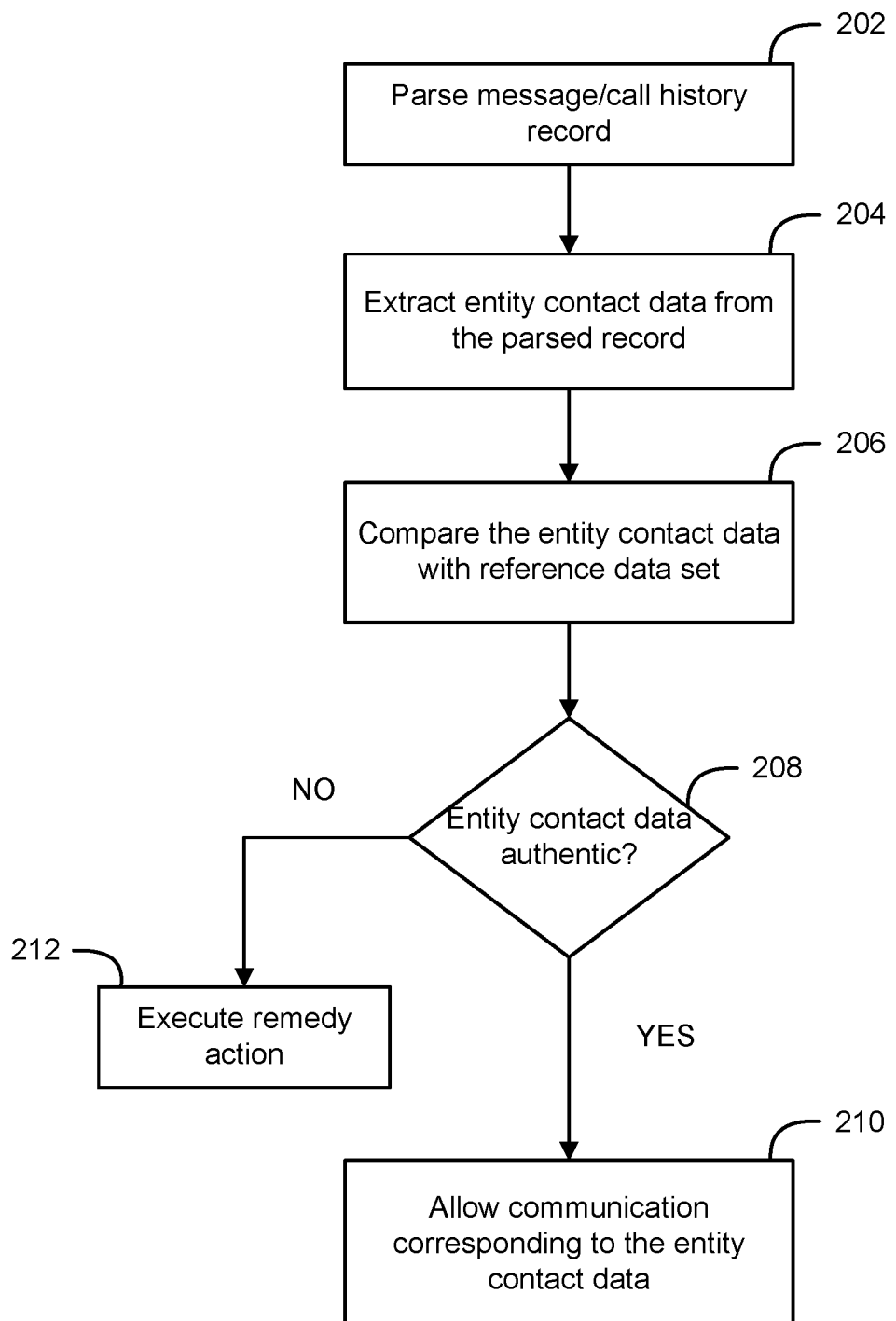
FIG. 2 illustrates a flowchart of a method for providing safe call back numbers according to an embodiment of the present invention.

FIG. 2 presents a flowchart of a method for providing safe call back numbers according to an embodiment of the present invention. Users may authenticate the content of their messages by allowing a message scanning system to access their message inboxes that are hosted on a message server. Alternatively, the system may also authenticate numbers in a user's call history on a user's client device, such as for "missed calls." The authentication may be initiated automatically (e.g., in the background) or in real-time (e.g., as a user accesses a message or about to dial a number in the message). Authenticating the content may include parsing a message (or call history) record, step 202. The message or call history record may include files, data, or other forms of information that may be retrieved from an electronic or virtual inbox on a message server, or on the user's client device, and may comprise a voice message, a transcribed voice message, a text message, or any other message format. Parsing a message or call history record may include identifying information of interest, such as sender/communicator name, metadata, a return phone number or email address, caller ID information, etc.

Entity contact data is extracted from the parsed message (or call history) record, step 204. The entity contact data may include a phone number, email address, or identifier and an alleged identity of the originator of the message, or anyone of the information of interest. The entity contact data is compared with a reference data set, step 206. Comparing the entity contact data may include analysis by cross referencing the entity contact data with genuine and fraud data which is related to entities (legitimate and fraudulent) and their contact information. For example, the system may compare a phone number and an alleged entity in the message record to a correct phone number associated with the alleged entity. The system may also use information that is associated with a call or message to identify and/or confirm an identity of an entity, such as incoming caller ID as well as the user's contact lists (e.g., information stored in their address book).

The analysis of the entity contact data may account for different information from the reference data set to decide whether a communicator is unwanted or suspicious. For example, comparing the entity contact data may include one or more of the following analysis:

(i) Caller carrier analysis—A carrier of the communicator's phone number may be determined and used to retrieve a score of the carrier. The carrier score may be used to determine whether a return phone number is trustworthy. A message from a communicator with a phone number having a low or untrustworthy carrier score may be flagged as suspicious. Carrier scores are described in further detail in commonly owned U.S. patent application Ser. No. 16/451,318, filed on Jun. 25, 2019, entitled "IDENTIFYING, SCREENING, AND BLOCKING OF CALLS FROM PROBLEMATIC TELECOMMUNICATIONS CARRIERS AND NUMBER BLOCKS," issued as U.S. Pat. No. 10,757,252, which is herein incorporated by reference in its entirety.

(ii) Cellular/landline analysis—The system may determine whether a communicator's phone number is a cellular or landline number. Since a call from a bank, automobile company, credit card company, and other help or call centers for major companies are primarily landlines and not cellular phone numbers. As such, communicators using cellular phone numbers may be treated suspiciously.

(iii) Fingerprinting—A "fingerprint" of a message or text may be created and compared with a database of fingerprints of known recordings of calls or messages (voice and/or text) from unwanted or wanted communicators by using speech processing, natural language processing, and machine learning algorithms with the information accumulated from the variety of sources. A fingerprint may comprise a unique identification of a sequence of characters designed to capture the content of, for example, a commonly appearing or known voice message. The unique identification may include a representation of text content data including keywords or tags, and an emphasis of importance of each keyword or tag that may be indicated with a variety of indicators, such as, ranking, arrangement, classification, word count, font size and color. Based on a comparison of the fingerprint of the message or text with the database of fingerprints, the system may determine whether the communicator is unwanted and suspicious and treat the entity contact data of the message record accordingly. Fingerprinting is described in further detail in commonly owned U.S. Pat. No. 10,051,121, issued on Aug. 14, 2018, entitled "SYSTEM AND METHOD FOR IDENTIFYING UNWANTED COMMUNICATIONS USING COMMUNICATION FINGERPRINTING," which is herein incorporated by reference in its entirety.

(iv) Match the message against a database of templates of fraudulent or suspicious messages—Textual messages or voice messages, for example, may be collected from a plurality of users into a database and analyzed for fraudulent and suspicious activity. Fraudulent messages may be used to create templates of fraudulent or suspicious messages for comparison with a given message. The templates may also include known patterns or attributes of fraudulent messages. The known patterns or attributes of fraudulent messages may include certain keywords or phrases commonly associated with scammers, telemarketer, etc.

A determination is made whether the entity contact data is authentic based on the verification, step 208. The determination may perform one or more of the aforementioned analysis and weigh results of the analysis according to certain thresholds. For example, one or more scores may be calculated for the entity contact data based on certain authenticity criteria. If given scores of one or more criteria exceed satisfactory thresholds, the entity contact data may be deemed authentic. According to one embodiment, a threshold for what constitutes a suspicious message or call may be lower given that the system is not necessarily blocking the message or communicator. Additionally, if the communicator is determined to be unwanted or suspicious, the entity contact data of the message may be determined as suspicious or fraudulent (e.g., not authentic). Otherwise, the message record (or a number in the user's call history) may be deemed authentic.

If the entity contact data is determined to be authentic, communication corresponding to the entity contact data may be allowed, step 210. That is, the user may be allowed to access/dial a link, number, or address in the message (or call history log). However, if the entity contact data is determined to be not authentic, a remedy action may be executed, step 212. Various remedy actions may be generated based on authenticity scoring. The remedy action may include at least one of generating a warning that the message contains fraudulent information, substituting content in the message record (or user call history) with verified information (e.g., with a safe/correct number or contact information), or blocking the communicator/sender of the message from incoming and outgoing communications. Accordingly, scaling of actions may correlate with the authenticity scoring.

Figure 3:
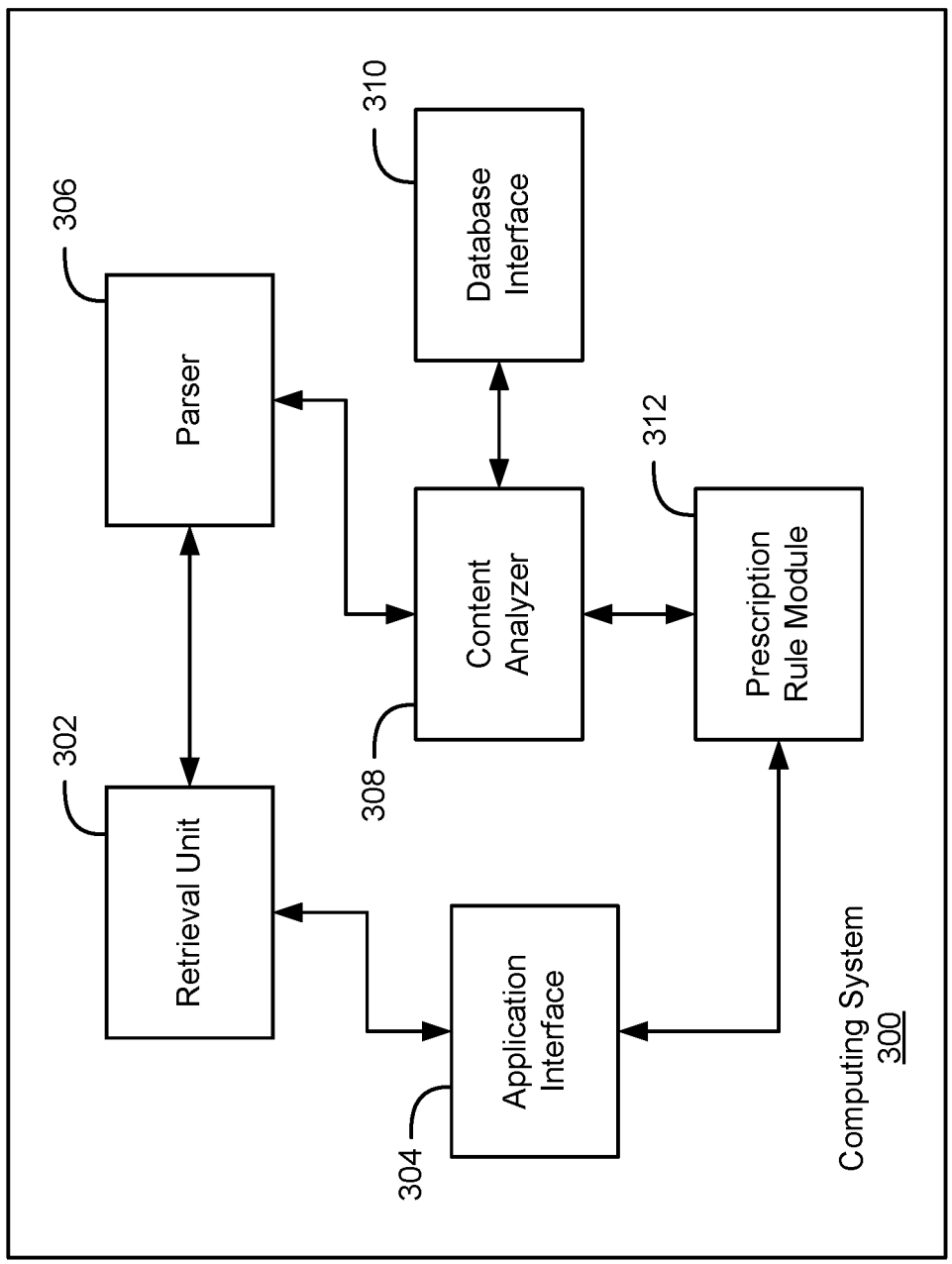
FIG. 3 illustrates a computing system according to another embodiment of the present invention.

FIG. 3 presents a computing system according to another embodiment of the present invention. Computing system 300 may comprise a retrieval unit 302 that can access a user's messages and call histories by communicating with a user's client device via application interface 304. The retrieval unit 302 may either retrieve messages and call histories directly from the user's client device or given permission/credentials to download the user's messages from a message server. Upon retrieval of the user's messages or call histories, parser 306 may parse the messages or call history entries to identify information of interest, such as sender/communicator name, metadata, a return phone number or email address, caller ID information, etc.

Content analyzer 308 may extract the information that is parsed by the parser 306. The extracted information may be analyzed by content analyzer 308 in accordance with a reference data set that can be retrieved from one or more databases through database interface 310. The extracted information may be cross referenced with the reference data set which may include correct information of safe entities and/or fraudulent information of unsafe entities. The content analyzer 308 may further determine whether the extracted information is either authentic or fraudulent based on a verification with the reference data set. For example, the content analyzer 308 may determine fraudulent phone numbers in the extracted information.

Content analyzer 308 may send results of analysis to prescription rule module 312. Prescription rule module 312 is operable to generate or provide remedy actions based on the determination of the fraudulent phone numbers. Remedy actions may comprise executable instructions that may be transmitted to the user's client device through application interface 304. The remedy actions may instruct the user's client device to perform certain operations if the message or call history is determined to include fraudulent information (e.g., fake caller ID). Exemplary remedy actions may include generating a warning that the message or call history contains fraudulent information, substituting content in the message with verified information (e.g., with a safe/correct number or contact information), or blocking the communicator/sender of the message from incoming and outgoing communications.

Figure 4:
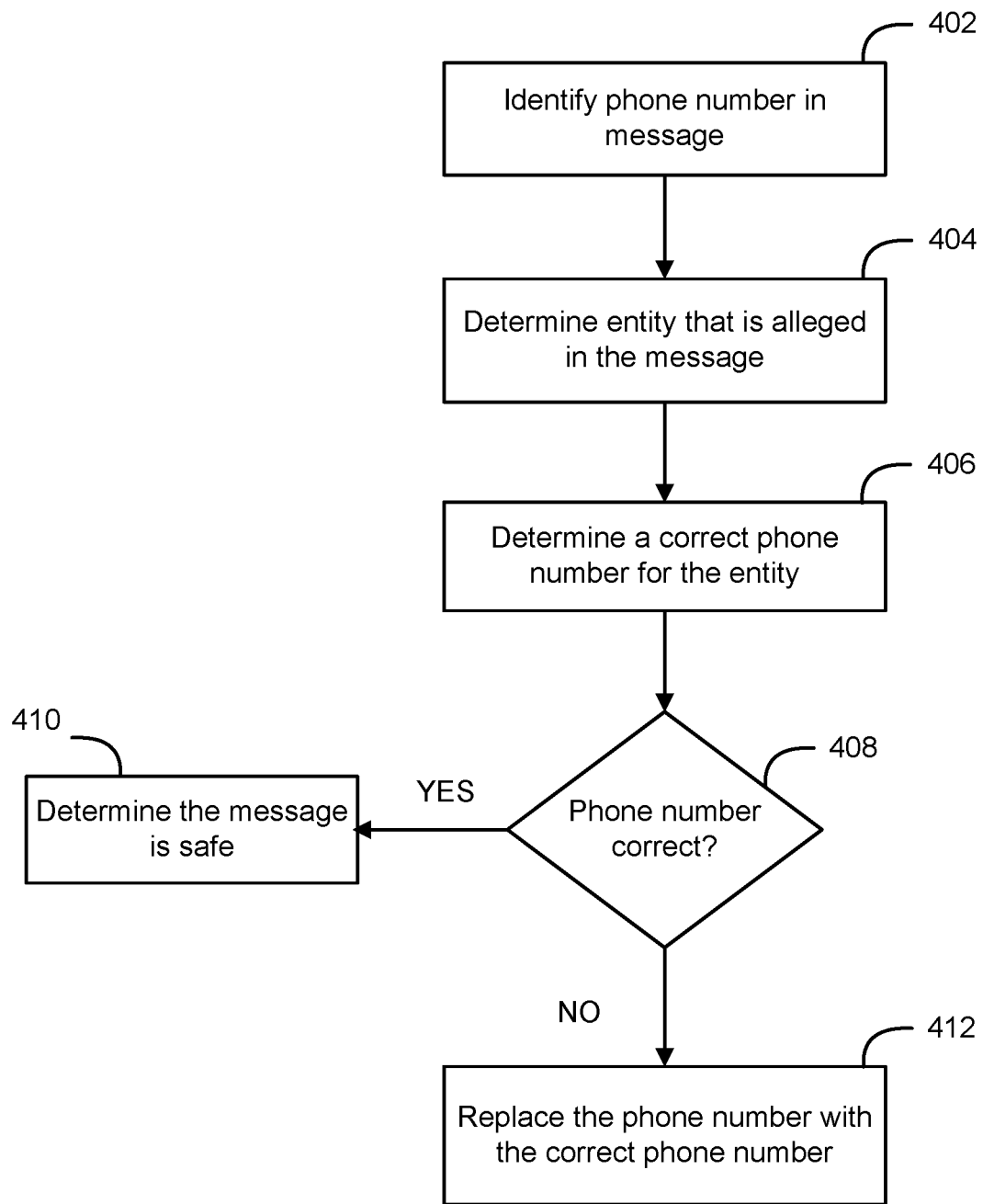
FIG. 4 illustrates a flowchart of a method for providing safe call back numbers according to an embodiment of the present invention.

FIG. 4 presents a flowchart of a method for providing safe call back numbers according to one embodiment. For any inbound call or message, a computing system may determine who a claimed caller actually is, and whether that caller is entirely trustable. A message or caller ID from a missed call data may be scanned by a computing system for an untrusted call back number. The message may comprise voice or text messages. Messages may be processed using natural language analyzers and phrase detection algorithms. A phone number in a message is identified, step 402. The phone number may be an untrusted phone number that a caller may want a recipient of the message to call or dial.

An entity that is alleged in the message is determined, step 404. For example, a caller leaving the message may claim to be associated with an entity, such as a bank or credit card company. A correct phone number for the entity is determined, step 406. The correct phone number may be determined by retrieving a phone number associated with the entity from a trusted data source.

The system determines whether the phone number in the message is the correct phone number, step 408. The phone number may be compared with the retrieved phone number. The system may also compare the phone number with a database including genuine and fraud data. Additionally, techniques, such as Signature-based Handling of Asserted Information Using toKENs ("SHAKEN") and Secure Telephone Identity Revisited ("STIR") may be used to authenticate the phone number. SHAKEN/STIR verification may comprise callers having their caller ID "signed" as legitimate by originating carriers and validated by a service provider at the destination to verify that an incoming call is really coming from a number listed on a caller ID display. If the phone number in the message is the same as the correct phone number, the message is determined to be safe, step 410. Otherwise, the phone number in the message is replaced with the correct phone number, step 412.

Figure 5:
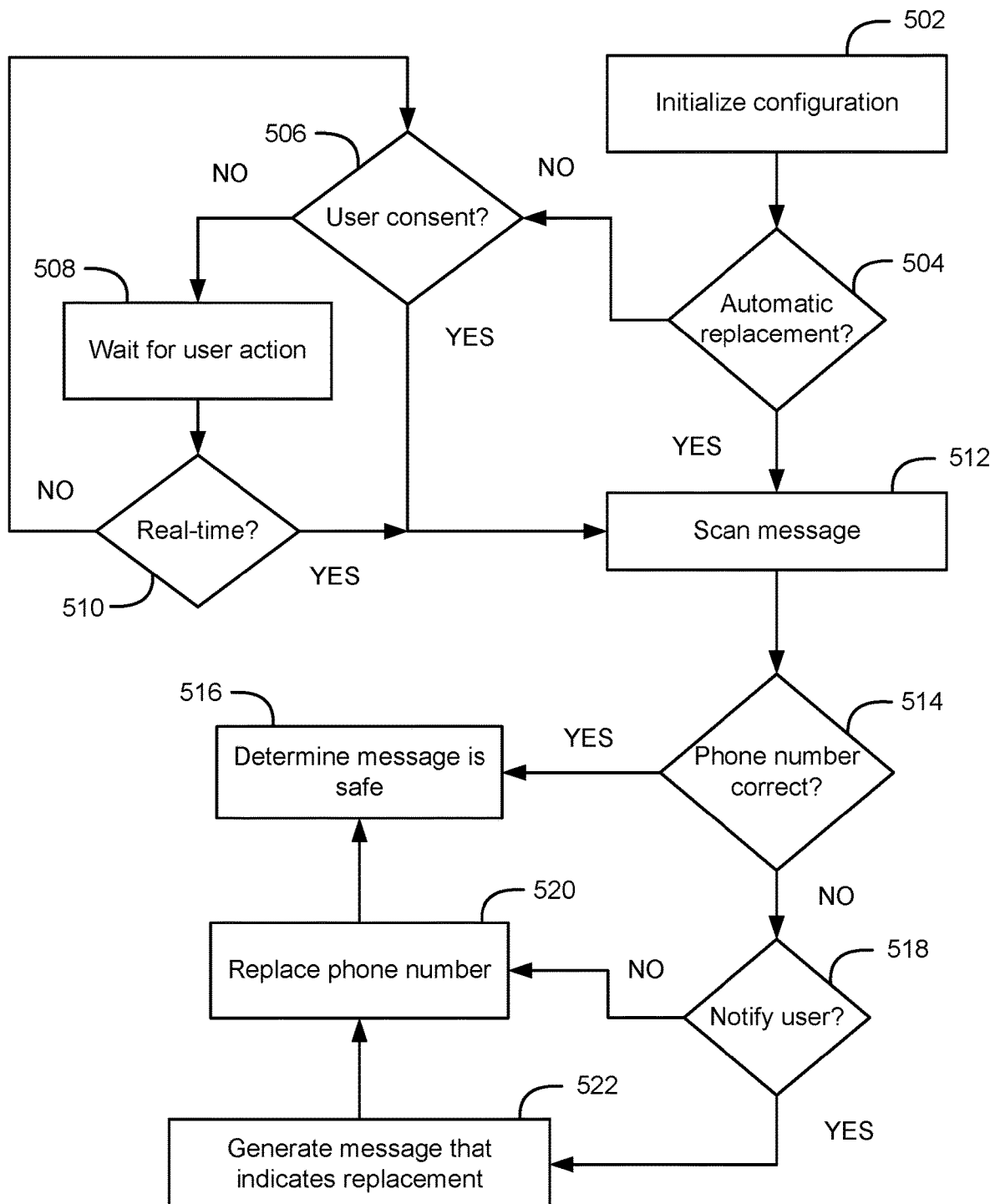
FIG. 5 illustrates a flowchart of a method for replacing call back numbers according to an embodiment of the present invention.

FIG. 5 presents a flowchart of a method for replacing call back numbers according to an embodiment of the present invention. A computing system initializes configurations for scanning a user's messages (or call history), step 502. The system determines whether automatic replacement has been selected, step 504. Configuring for automatic replacement may allow the computing system to directly proceed to scan a message, step 512. If not, the system may determine if the user has consented to scan a message, step 506. Consenting to the scan may be an on-demand request.

If the user has not consented to the scan, the system waits for user action, step 508. The system check determines if a user's actions requires a real-time response, such as attempting to dial a phone number contained within the message (or call history). If a real-time response is triggered, the system proceeds to scan the message at step 512. On the other hand, a user action that does not require a real-time response, the system may loop back to step 506 to wait for the user's consent. Receiving the user consent allows the computing system to scan the message at step 512.

The computing system can determine whether a phone number in the scanned message (or call history) is correct for an entity asserted in the message, step 514, by consulting a reference data set or a database storing genuine and fraud data. A correct phone number may be retrieved for the asserted entity and compared with the phone number in the message. A message is determined to be safe if the phone number is correct, step 516.

If the phone number is not correct, the user may be optionally notified of a replacement of the phone number in the message (or call history), step 518. The option may be configured with a setting by the user or predefined by the system. If no notification is needed, the system replaces the phone number in the message (or the user's call history log) with the correct phone number, step 520. A message that indicates the replacement is generated if the user is to be notified, step 522, prior to replacing the phone number.

FIGS. 1 through 5 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A system for providing safe call back numbers, the system comprising:
    a processor; and
    a memory having executable instructions stored thereon that when executed by the processor cause the processor to:
        parse a message record, the message record comprising a text or voice message left or sent by a communicator;
        extract entity contact data from content of the parsed message record, the entity contact data including at least a phone number and data representing an identity of an alleged legitimate entity including at least a name associated with the alleged legitimate entity;
        compare the extracted entity contact data with a reference data set that is retrieved from a database storing genuine and fraud data, the reference data set including legitimate entities and contact data corresponding to the legitimate entities;
        determine the entity contact data is not authentic based on the extracted entity contact data not matching the contact data corresponding to the legitimate entities in the comparison; and
        execute a remedy action based on the determination, the remedy action including a replacement of the phone number in the message record with an authentic phone number of the legitimate entity based on the determination.

2. The system of claim 1 wherein the remedy action further includes a message that the phone number has been replaced.

3. The system of claim 1 wherein the remedy action is performed in advance of an attempt to call the phone number.

4. The system of claim 1 wherein the remedy action is performed in real-time as a user attempts to dial the phone number.

5. The system of claim 1 wherein the remedy action further includes a warning that the message record includes fraudulent information.

6. The system of claim 1 wherein the remedy action further includes blocking of the communicator from incoming and outgoing communications.

7. The system of claim 1 wherein the remedy action further includes an insertion of a visual indicator or icon next to the phone number in the message record that includes an alert that the phone number is suspicious.

8. The system of claim 1 wherein the processor is further configured to:
    determine that the communicator is unwanted or suspicious based on the comparing; and
    determine the entity contact data is not authentic based on the determination that the communicator is unwanted or suspicious.

9. The system of claim 1 wherein the message record comprises a transcribed voice message.

10. The system of claim 1 wherein the processor is further configured to perform at least one of caller carrier analysis, cellular/landline analysis, fingerprinting, and matching to a database of templates associated with fraudulent or suspicious messages.

11. The system of claim 1 wherein the processor is further configured to replace the entity contact data in the message record with verified contact data based on the determination that the contact data is not authentic.

12. The system of claim 1 wherein the processor is further configured to:
identify caller identification data; and
confirm the identity based on the caller identification data and a user contact list.

13. A system for providing safe call back numbers, the system comprising:
a database including a reference data set, the reference data set including genuine and fraud data wherein the genuine and fraud data includes entities that are legitimate and contact information corresponding to the entities;
a message scanning server communicatively coupled to a message server, the message scanning server configured to:
parse message records from the message server, the message records comprising text or voice messages left or sent by communicators,
analyze the message records for untrustworthy phone numbers by comparing contact information from content of the text or voice messages of the message records to the contact information corresponding to the legitimate entities in the reference data set, the contact information from the content of the text or voice messages including at least a phone number and data representing an identity of an alleged legitimate entity including at least a name associated with the alleged legitimate entity, and
determine untrustworthy phone numbers in the message records based on the contact information from the content of the text or voice messages not matching the contact information corresponding to the legitimate entities in the reference data set from the analysis; and
a prescription rule server communicatively coupled to the message scanning server, the prescription rule server configured to generate remedy actions based on the determination of the untrustworthy phone numbers, wherein the remedy actions include a replacement of the untrustworthy phone numbers in the message records with authentic phone numbers of the legitimate entities.

14. The system of claim 13 wherein the remedy action includes at least one of preventing calls to the untrustworthy phone numbers and generating warnings of the untrustworthy phone numbers.

15. The system of claim 13 wherein the database further comprises one or more of a fingerprinting database, a database of suspicious text and messaging patterns, a database of carriers and their scores, and a database of valid phone numbers.

16. The system of claim 13 wherein the message records comprise at least one of voice messages, transcribed voice messages, and text messages.

17. The system of claim 13 wherein the message scanning server is further configured to:
parse a call history record;
extract contact data from the parsed call history record;
compare the contact data with the reference data set;
determine the contact data is not authentic based on the comparison; and
the prescription rule server is further configured to replace the contact data with verified contact data based on the determination that the contact data is not authentic.

18. A method, in a data processing system comprising a processor and a memory, for providing safe call back numbers, the method comprising:
parsing, by the data processing system, message records from a message server, the message records comprising text or voice messages left or sent by communicators;
analyzing, by the data processing system, the message records for untrustworthy phone numbers by comparing contact information from content of the text or voice messages of the message records to contact information corresponding to legitimate entities in a reference data set that is retrieved from a database, the reference data set including genuine and fraud data wherein the genuine and fraud data includes entities that are legitimate and contact information corresponding to the entities, and the contact information from the content of the text or voice messages including at least a phone number and data representing an identity of an alleged legitimate entity including at least a name associated with the alleged legitimate entity;
determining, by the data processing system, untrustworthy phone numbers in the message records based on the contact information from the content of the text or voice messages not matching the contact information corresponding to the legitimate entities in the reference data set from the analysis; and
generating, by the data processing system, remedy actions based on the determination of the untrustworthy phone numbers, wherein the remedy actions include a replacement of the untrustworthy phone numbers in the message records with authentic phone numbers of the legitimate entities.

19. The method of claim 18 further comprising analyzing the message records by performing at least one of caller carrier analysis, cellular/landline analysis, fingerprinting, and matching to a database of templates associated with untrustworthy or suspicious messages.

20. The method of claim 18 wherein the remedy action includes at least one of preventing calls to the untrustworthy phone numbers and generating warnings of the untrustworthy phone numbers.

21. The method of claim 18 further comprising:
parsing a call history record;
extracting entity contact data from the parsed call history record;
comparing the extracted entity contact data with the reference data set;
determining the entity contact data is not authentic based on the comparison; and
replacing the contact data with verified contact data.

22. The method of claim 18 further comprising:
identifying caller identification data associated with the message records; and
confirming identity of the communicators based on the caller identification data and a user contact list.

* * * * *